(Model.)
C. F. HECKER.
EGG TESTER.
No. 265,413. Patented Oct. 3, 1882.
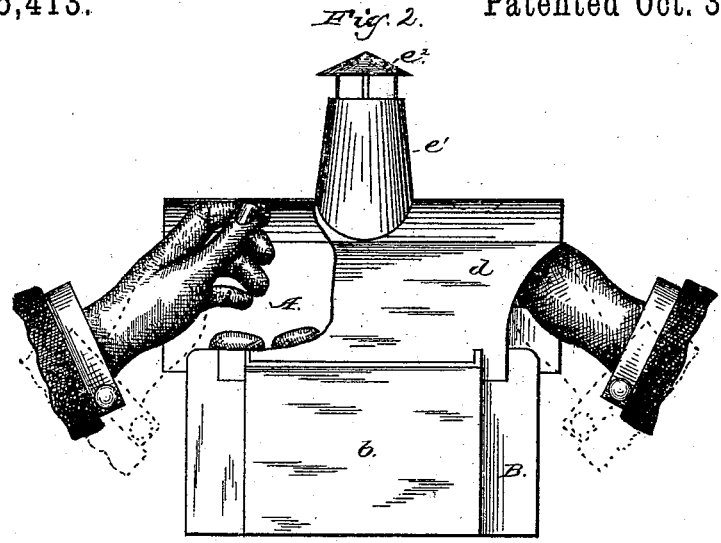
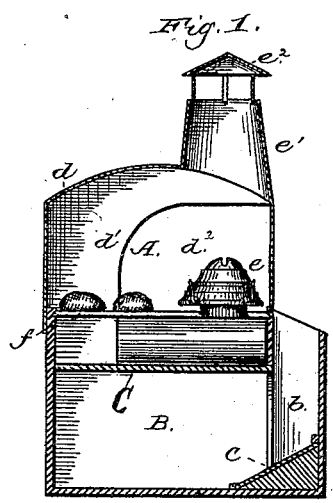
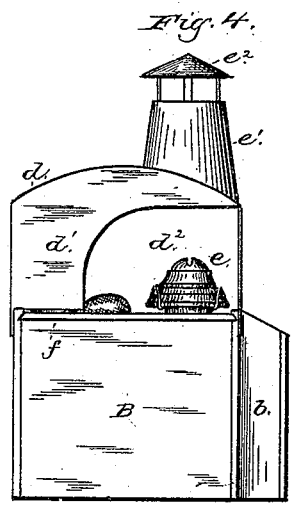
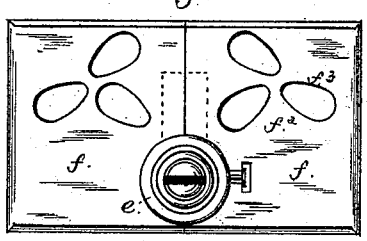
Witnesses:
J. E. Clark.
P. B. Turpin.
Inventor:
Charles F. Hecker
By R. S. & A. P. Lacey
Attys.

UNITED STATES PATENT OFFICE.

CHARLES F. HECKER, OF LITCHFIELD, ILLINOIS.

EGG-TESTER.

SPECIFICATION forming part of Letters Patent No. 265,413, dated October 3, 1882.

Application filed July 13, 1882. (Model.)

*To all whom it may concern:*

Be it known that I, CHARLES F. HECKER, a citizen of the United States, residing at Litchfield, in the county of Montgomery and State of Illinois, have invented certain new and useful Improvements in Egg-Testers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in devices for aiding in the testing of eggs by the casting of light through them.

It consists in the construction, combination, and arrangement of the several parts, as will be hereinafter fully described, and specifically pointed out in the claims.

In the drawings, Figure 1 is a vertical section. Fig. 2 is a front elevation. Fig. 3 is a plan with the hood removed. Fig. 4 is a side elevation, and Fig. 5 is a detached view.

A represents the upper or light chamber, and B the lower chamber or mirror-containing box. The box B is provided with an offset, $b$, at the front of the device, the said offset being open at the top, as shown in Fig. 1, so that the mirror can be seen by the operator. At the lower end of this offset, and extending slightly within the box B, is placed the mirror $c$, properly inclined, as shown in Fig. 1, so that the eggs, when placed in position on the slides, as will be described, will be reflected thereon in the operation of testing. The upper or light chamber, A, is inclosed by the hood $d$, which I preferably make of tin or some other bright metal, so that it will serve as a reflector of the light. The top of this hood is concave on its inner side, as shown. This hood is secured firmly on the casing of the lower chamber, B. The front and rear sides of this hood are closed.

$d'$ $d'$ are plates depending from the top of the hood, at the opposite ends thereof, and forming aprons, as shown. These aprons are cut away on their lower and forward sides to form the hand-openings $d^2$. These openings are made of a size sufficient to admit the hand of the operator, but still small enough for the operator's hands to completely close them after he has placed the eggs for testing. This is clearly shown in Fig. 2, where, after the eggs have been placed on the slide, the operator's hand is indicated in dotted lines closing the openings $d^2$, and rested against the inner sides of the aprons $d'$, as shown. By this construction I provide a hood or light-chamber secured rigidly to the lower casing, and constructed so that the hand of the operator forms it a close chamber in which the light of the lamp is concentrated on the eggs being tested. It will be seen in Fig. 2 that I also cut away a slight portion from the ends of the front plate of hood. This, however, while it is convenient, I do not regard as essential to the proper working of the tester.

C represents a bar or lamp-stand extending across the box B below the egg-carrier, hereinafter described, and midway the ends of the box. This bar serves as a support for the reservoir of the lamp, hereinafter described.

$e$ represents the lamp supported with its reservoir rested on bar C centrally between the openings $d^2$ in the ends of the hood, and its burner extended within the chamber A, as shown. I arrange this lamp equal distance from the ends of the light-chamber, and between the groups of egg-openings, as shown, as by that means the light is cast directly and with an equal intensity on the eggs, and better results are attained. The lamp being supported with its reservoir below the egg-slides, as shown, the burner is brought close to the eggs being tested, and a stronger light and a better reflection are obtained. The lamp-reservoir is constructed, as shown in Fig. 1 and dotted lines, Fig. 3, for economy in holding the oil. Any ordinary lamp, however, could be used.

$e'$ represents a chimney formed in hood $d$ immediately over the lamp $e$. It is provided with a cap or cowl, $e^2$.

$f$ $f$ represent the egg-carrying platforms. They slide and are supported in grooves cut in the front and rear end board of casing of chamber B, as shown in Figs. 1 and 4. These slides form the partition between chambers A and B. Their inner or meeting edges are each provided with a semicircular recess, $f^4$, as shown in Fig. 5, to fit around the neck of lamp $e$, and they are provided with a series of openings, $f^3$ $f^3$, arranged in threes, as shown, and formed to receive the eggs. These openings, it will be seen, are arranged one toward the opening $d^2$, or ends of the hood, and the two toward the center, or away from the openings, for convenience in handling, as that is the position of the eggs in the hand of the operator when they are inserted through the band-openings $d^2$, as described. The holes are arranged close together, as shown, so that when the eggs are laid therein they rest one against the other, so that in raising them from the holes by the hand there is no danger of cracking them. When it is desired to count by the quarter-dozen one series of holes may be covered by a piece of paper, and the opening at that end of the box may be closed.

In the operation of my device, it will be seen, a person does not need turn back any cover or lid, or otherwise change the position of any of the parts to remove the eggs or slide.

I am aware that egg-testers consisting of a lower or mirror-containing box having an egg-carrier provided with suitable openings, and a hood or light-chamber mounted on said box, and a lamp placed at the end thereof, whereby the light is thrown under it, have been employed, and also that the egg-openings have been arranged, for convenience, in groups of three over a reflecting-mirror, and I do not broadly claim such construction as my invention.

Having thus described my invention, what I claim, and desire to secure by Letters Patent, is—

1. The combination, with the box B, mirror $c$, and platform $f$, provided with openings $f^3$ for holding the eggs, and placed at the top of the box B, of the hood or reflector $d$, extended from side to side and over the top of the box B, and having its ends partially closed by aprons $d'$ $d'$, and the lamp $e$ below the reflector and midway between the ends thereof, and between the two series of openings $f^3$ $f^3$, as set forth.

2. In an egg-tester, the combination, with the box B, provided with a lamp-stand or support arranged midway between its ends and slightly below its top, and the lamp $e$, placed on the lamp-stand, of the egg-slides $f$, made in two parts, and provided with recesses $f^4$ $f^4$, and sliding into place on top of the box and on opposite sides of and against the neck of the lamp-burner, as set forth.

In testimony whereof I affix my signature in presence of two witnesses.

CHARLES F. HECKER.

Witnesses:
  FRED EHRHARDT,
  FRED KOEPPE.